United States Patent
Chen et al.

(10) Patent No.: US 8,661,137 B2
(45) Date of Patent: Feb. 25, 2014

(54) NETWORK-BASED INFORMATION PROCESSING METHOD AND SYSTEM, AND MOBILITY MANAGEMENT NETWORK ELEMENT

(75) Inventors: Zhongping Chen, Shanghai (CN); Wenfu Wu, Shanghai (CN); Xiaoji Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 13/333,699

(22) Filed: Dec. 21, 2011

(65) Prior Publication Data

US 2012/0096154 A1  Apr. 19, 2012

Related U.S. Application Data

(63) Continuation of application No. PCT/CN2010/074445, filed on Jun. 25, 2010.

(30) Foreign Application Priority Data

Jun. 25, 2009  (CN) .......................... 2009 1 0108527

(51) Int. Cl.
*G06F 15/173* (2006.01)
(52) U.S. Cl.
USPC ........................... 709/226; 709/224; 709/223
(58) Field of Classification Search
USPC ............... 709/224, 226, 223; 726/7; 719/325; 370/252, 232; 705/1.1; 455/573
See application file for complete search history.

(56) References Cited

U.S. PATENT DOCUMENTS

| | | | |
|---|---|---|---|
| 7,680,478 B2 | 3/2010 | Willars et al. | |
| 2003/0065766 A1* | 4/2003 | Parry | 709/224 |
| 2006/0023658 A1 | 2/2006 | Phillips et al. | |
| 2007/0226756 A1* | 9/2007 | Kubo et al. | 719/325 |
| 2008/0153521 A1 | 6/2008 | Benaouda et al. | |
| 2009/0204863 A1 | 8/2009 | Kim et al. | |
| 2010/0011063 A1 | 1/2010 | Blaiotta et al. | |
| 2010/0110890 A1* | 5/2010 | Rainer et al. | 370/232 |
| 2010/0151918 A1* | 6/2010 | Annambhotla et al. | 455/573 |

(Continued)

FOREIGN PATENT DOCUMENTS

| | | |
|---|---|---|
| CN | 1671221 A | 9/2005 |
| CN | 101009927 A | 8/2007 |

(Continued)

OTHER PUBLICATIONS

"Link Results on CSI RS Design," Panasonic, 3GPP TSG RAN WG1 Meeting #59bis, R1-100373, Valencia, Spain, Jan. 18-22, 2010, 5 pages.

(Continued)

*Primary Examiner* — Le H Luu
(74) *Attorney, Agent, or Firm* — Slater & Matsil, L.L.P.

(57) ABSTRACT

An information processing method and system, and a mobility management network element are provided by the embodiments of the present invention. Wherein, the information processing method includes: receiving a message that includes data information of a user equipment UE; determining that the UE is a UE of low data usage; and sending the received data information of the UE to a machine type control server. By using the method, no bearer is activated, and the network side does not need to allocate bearer resources for data transmission of the UE. Therefore, the network load is reduced.

10 Claims, 6 Drawing Sheets

(56) References Cited

U.S. PATENT DOCUMENTS

| | | | |
|---|---|---|---|
| 2010/0192212 A1* | 7/2010 | Raleigh | 726/7 |
| 2010/0312572 A1* | 12/2010 | Ramer et al. | 705/1.1 |
| 2011/0211465 A1* | 9/2011 | Farrugia et al. | 370/252 |
| 2012/0096154 A1* | 4/2012 | Chen et al. | 709/224 |

FOREIGN PATENT DOCUMENTS

| | | |
|---|---|---|
| CN | 101180852 A | 5/2008 |
| CN | 101296508 A | 10/2008 |
| CN | 101438612 A | 5/2009 |
| CN | 101662833 A | 3/2010 |
| CN | 101808370 A | 8/2010 |
| WO | WO 2010/006540 A1 | 1/2010 |

OTHER PUBLICATIONS

"Aperiodic CQI Reporting for Carrier Aggregation," Panasonic and HTC, R1-101262, 3GPP TSG-RAN WG1 Meeting 60, San Francisco, CA, USA, Feb. 22-26, 2010, 2 pages.

"3GPP TS 36.213 v9.1.0 Technical Specification—$3^{rd}$ Generation Partnership Project; Technical Specification Group Radio Access Network; Evolved Universal Terrestrial Radio Access (E-UTRA); Physical Layer Procedures (Release 9)," $3^{rd}$ Generation Partnership Project, Mar. 2010, 65 pages.

International Search Report regarding International Patent Application No. PCT/CN2011/072465, dated Jul. 14, 2011, 4 pages.

"3GPP TS 22.368 V0.4.0 Technical Specification—$3^{rd}$ Generation Partnership Project; Technical Specification Group Services and System Aspects; Service Requirements for Machine-Type Communications; Stage 1 (Release 10)," $3^{rd}$ Generation Partnership Project, May 2009, 21 pages.

"3GPP TR 22.868 V8.0.0 Technical Specification—$3^{rd}$ Generation Partnership Project; Technical Report Group Services and System Aspects; Study on Facilitating Machine to Machine Communication in 3GPP Systems (Release 8)," $3^{rd}$ Generation Partnership Project, Mar. 2007,15 pages.

"3GPP TS 23.107 V8.0.0 Technical Specification—$3^{rd}$ Generation Partnership Project; Technical Specification Group Services and System Aspects; Quality of Service (QoS) Concept and Architecture (Release 8)," $3^{rd}$ Generation Partnership Project, Dec. 2008, 40 pages.

"Proposed Service Requirements for the Category Low Data Usage," KPN, S1-080020, 3GPP TSG-SA1 #44, San Antonio, Texas, USA, Feb. 2-6, 2008, 1 page.

Extended European Search Report regarding European Patent Application No. 10791579, dated Sep. 21, 2012, 9 pages.

International Search Report regarding International Patent Application No. PCT/CN2010/074445, dated Sep. 30, 2010, 4 pages.

Written Opinion of the International Searching Authority regarding International Patent Application No. PCT/CN2010/074445, dated Sep. 30, 2010, 4 pages.

\* cited by examiner

NETWORK-BASED INFORMATION PROCESSING METHOD AND SYSTEM, AND MOBILITY MANAGEMENT NETWORK ELEMENT

CROSS-REFERENCE TO RELATED APPLICATIONS

This application is a continuation of International Application No. PCT/CN2010/074445, filed on Jun. 25, 2010, which claims priority to Chinese Patent Application No. 200910108527.5, filed on Jun. 25, 2009, both of which are hereby incorporated by reference in their entireties.

FIELD OF THE INVENTION

The present invention relates to the field of communications, and in particular, to an information processing method and system, and a mobility management network element.

BACKGROUND OF THE INVENTION

M2M is an abbreviation of machine-to-machine (Machine to Machine) communication. Broadly speaking, M2M communication includes machine-to-machine communication, machine-to-mobile phone communication such as remote surveillance on a user equipment, and mobile phone-to-machine communication such as remote control exercised by a user equipment. However, the essence of M2M is machine-to-machine communication.

In contrast to Human-to-Human (Human to Human, H2H) terminals, an M2M terminal has its own features such as low data usage Low Data Usage. Such M2M terminals may exist in large numbers, but seldom interact with the network side or interact with each other, and the interaction involves little data usage. H2H terminals may also take on the feature of low data usage.

Therefore, if the interaction with terminals of low data usage works according to the prior art, a network side needs to allocate plenty of bearer resources to the terminals of low data usage, which drastically affects normal services of other types of terminals.

SUMMARY OF THE INVENTION

Herein, embodiments of the present invention provide an information processing method and system, and a mobility management network element so that the network side does not need to allocate bearer resources to UEs of low data usage when processing services of such UEs, which does not affect normal services of other types of terminals.

An information processing method includes:
receiving a message that includes data information of a user equipment UE;
determining that the UE is a UE of low data usage; and
sending the received data information of the UE to a machine type control server.

An information processing method includes:
receiving a service request message sent by a machine type control server;
determining that a user equipment UE corresponding to the service request message is a UE of low data usage, and determining that the UE is in a connected state; and
according to the service request message, instructing the UE to send data information to the machine type control server or sending data information sent by the machine type control server to the UE.

A mobility management network element includes:
a first receiving unit, configured to receive a message that includes data information of a user equipment UE;
a first determining unit, configured to determine that the UE is a UE of low data usage; and
a sending unit, configured to send the received data information of the UE to a machine type control server.

A mobility management network element includes:
a second receiving unit, configured to receive a service request message sent by a machine type control server;
a second determining unit, configured to determine that a user equipment UE corresponding to the service request message received by the second receiving unit is a UE of low data usage, and determine that the UE is in a connected state; and
a processing unit, configured to, according to the service request message, instruct the UE to send data information to the machine type control server, or send data information sent by the machine type control server to the UE.

An information processing system includes a mobility management network element and a machine type control server, where:
the machine type control server is configured to send a service request message to the mobility management network element; and
the mobility management network element is configured to receive the service request message sent by the machine type control server, determine that a user equipment UE corresponding to the service request message is a UE of low data usage, determine that the UE is in a connected state, and, according to the service request message, instruct the UE to send data information to the machine type control server or send data information sent by the machine type control server to the UE.

By using the method provided by the embodiments of the present invention, when the UE of low data usage implements a service, the mobility management network element sends the data sent by the UE to the machine type control server so that the machine type control server processes the data of the UE. Further, when the UE of low data usage sends data information to the mobility management network element, no bearer is activated. The data information is transmitted to the mobility management network element through a control plane, and the network side does not need to allocate bearer resources for data transmission of the UE. Therefore, the network load is reduced, and services of other types of terminals are not affected.

BRIEF DESCRIPTION OF THE DRAWINGS

To make the technical solution in the embodiments of the present invention or the prior art clearer, the accompanying drawings used in the description of the embodiments of the present invention or the prior art are briefly described hereunder. Apparently, the accompanying drawings illustrate only some exemplary embodiments of the present invention, and persons of ordinary skill in the art can derive other drawings from these drawings without any creative effort.

DETAILED DESCRIPTION OF THE EMBODIMENTS

The technical solution provided in the embodiments of the present invention is hereinafter described clearly and completely with reference to the accompanying drawings. Evidently, the described embodiments are a part rather than all of the embodiments of the present invention. All other embodiments derived by persons of ordinary skill in the art from the embodiments of the present invention without any creative effort, shall fall within the scope of the present invention.

Figure 1:
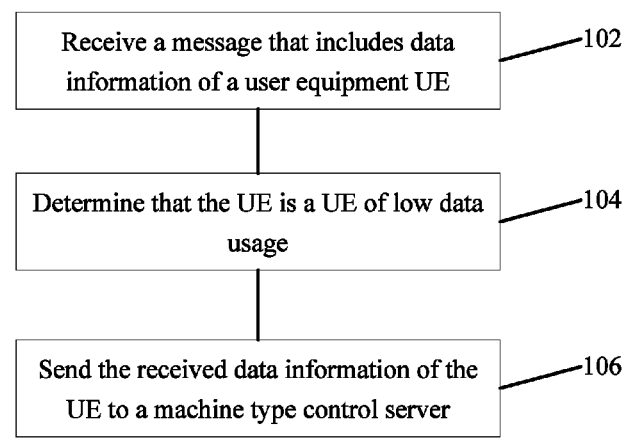
FIG. 1 is a first schematic diagram of an information processing method according to an embodiment of the present invention.

Referring to FIG. 1, an embodiment of the present invention provides an information processing method, including the following steps:

102: A mobility management network element receives a message that includes data information of a user equipment UE.

The UE may encapsulate the data information to be sent to the mobility management network element into a NAS message, and send the NAS message to the mobility management network element. After receiving the NAS message, the mobility management network element parses the NAS message to obtain the data information sent by the UE.

Optionally, before sending the message that includes the data information of the user equipment, the user equipment may send a registration request message to the mobility management network element for registration. The registration request message may be an attach request message Attach Request, or a routing area update request message RAU Request, or a tracking area update request message TAU Request, and so on.

Optionally, the registration request message may include indication information for indicating that the user equipment is a user equipment of low data usage. According to the indication information, the mobility management network element determines that the UE is a UE of low data usage.

The mobility management network element may be a serving GPRS support node (Serving GPRS Support Node, SGSN) or a mobile management entity (Mobile Management Entity, MME), and so on.

104: The mobility management network element determines that the UE is a UE of low data usage. This step may comprises the following steps of:

the mobility management network element obtains subscription information of the UE, and, if subscription data of the UE includes information for indicating that the UE is a UE of low data usage, the mobility management network element, according to the subscription data of the UE, determines that the UE is a UE of low data usage; or the mobility management network element receives subscription information of the UE sent by a home subscriber server, and, if the subscription information of the UE includes information for indicating that the UE is a UE of low data usage, the mobility management network element determines, according to the subscription information of the UE, that the UE is a UE of low data usage; or the registration request message sent by the UE to the mobility management network element includes information indicating that the UE is a UE of low data usage, for example, the registration request message includes indication information for indicating that the UE is a UE of low data usage, or, the registration request message includes an information element indicating that the UE is a UE of low data usage, and the mobility management network element determines, according to the registration request message, that the user equipment is a user equipment of low data usage; or if the message sent by the UE to the mobility management network element includes the UE's information of low data usage, the mobility management network element determines, according to the message, that the user equipment is a user equipment of low data usage.

It should be noted that in this embodiment and subsequent embodiments described herein, the UE of low data usage refers to a type of UEs that exist in large numbers and seldom interact with the network side, where the interaction with the network side involves little data traffic. The terminal of low data usage may be a machine to machine M2M terminal or an H2H terminal, and the M2M terminal may also be known as an M2ME (Machine to Machine Equipment), MTC (Machine Type Controller) terminal, and so on.

106: The mobility management network element sends the data information of the UE to a machine type control server.

The mobility management network element determines that the UE is a UE of low data usage, and transmits the received data information of the UE to the machine type control server through a control plane.

Optionally, the mobility management network element needs to set up an association with the machine control type server. This step may comprises the following steps of:

the mobility management network element sends a registration request message (such as a location update request message) to the machine type control server; and the machine type control server returns a location update acknowledgement message to the mobility management network element. In this way, an association is set up between the mobility management network element and the machine type control server, that means, the mobility management network element's registration with the machine type control server is finished.

Optionally, after the mobility management network element sets up an association with the machine type control server, the mobility management network element may obtain address information of the machine type control server according to the association; and the machine type control server may also obtain address information of the mobility management network element according to the association.

Optionally, the obtaining the address information of the machine type control server by the mobility management network element may comprises the following steps of:

receiving subscription information of the user equipment from the home subscriber server, and obtaining the address information of the machine type control server according to the subscription information of the user equipment; or configuring default address information of the machine type control server associated with the mobility management network element on the mobility management network element; or if the mobility management network element has already registered with the machine type control server, the mobility management network element may obtain the address information of the machine type control server according to registration information directly.

The machine type control server MTC server in this embodiment and all subsequent embodiments may be interpreted as an M2M application server which stores information or data about the user equipment of low data usage or about group of user equipments of low data usage, and specific subscription information of the user equipments of low data usage, and further, subscription information of the group of user equipments of low data usage. This server may be known as an M2ME group management server or an M2ME management server.

In this embodiment, when the UE sends a message that includes the data information of the UE to the mobility management network element, if the mobility management network element determines that the UE is a UE of low data usage, the mobility management network element sends the received data information of the UE to the MTC server so that the UE exchanges data with the MTC server. When the UE of low data usage sends data information to the mobility management network element, no bearer is activated. The data information is transmitted to the mobility management network element through a control plane, the network side does not need to allocate bearer resources for data transmission of the UE. Therefore, the network load is reduced, and services of other types of terminals are not affected.

Figure 2:
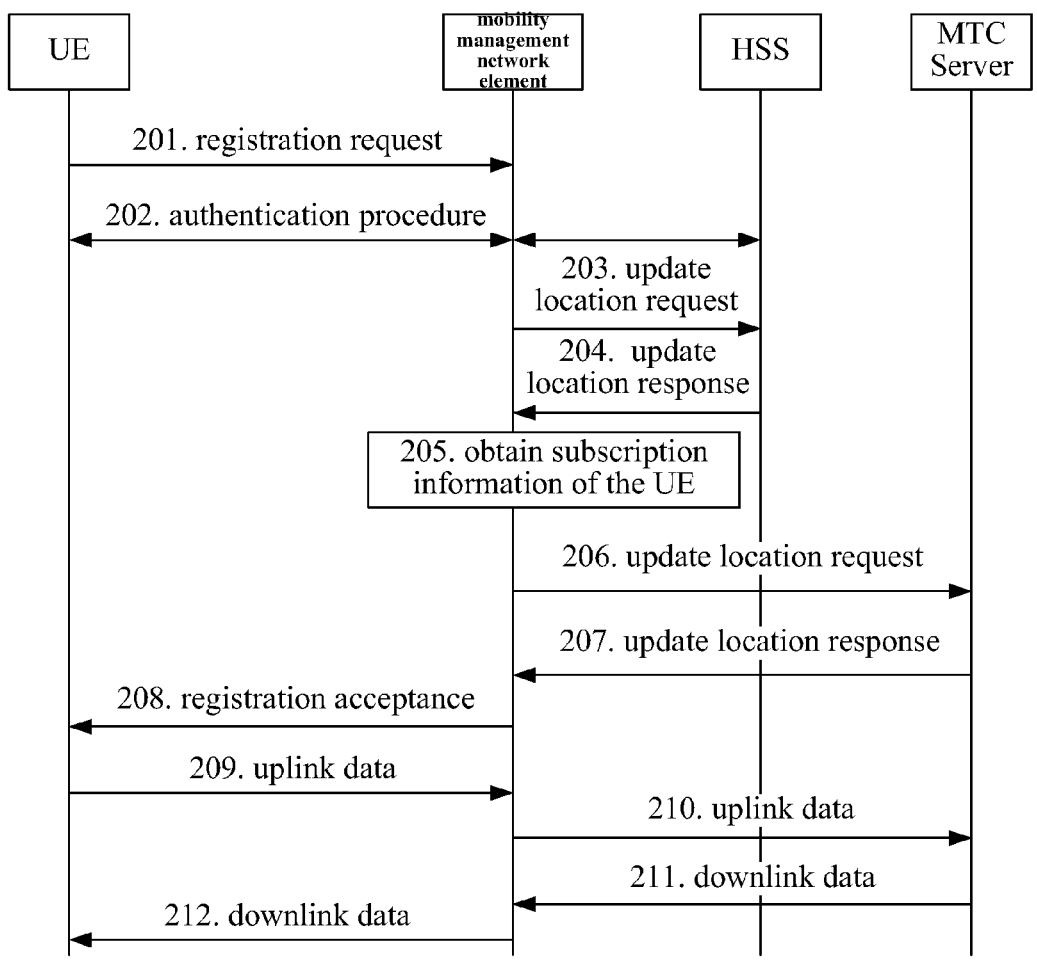
FIG. 2 is a second schematic diagram of an information processing method according to an embodiment of the present invention.

Referring to FIG. 2, an embodiment of the present invention provides an information processing method. In a scenario where a UE uploads data to a MTC server, the method comprises the following steps of:

201: The UE sends a registration request message to a mobility management network element.

Herein, the mobility management network element may be an SGSN or an MME, and the registration request message may be an attach request message Attach Request, or a router area update request message RAU Request, or a tracking area update message TAU Request, and so on;

202: An authentication process is implemented among the UE, the mobility management network element, and the home subscriber server (Home Subscriber Server, HSS) to authenticate the UE.

203: The mobility management network element sends a update location request message to the HSS. The update location request message may include identity information of the UE, and further, include an ID of the mobility management network element.

Herein, the ID of the mobility management network element may be an SGSN Number or an MME ID, and so on, and the ID of the UE may be an international mobile subscriber identification number (International Mobile Subscriber Identification Number, IMSI) or an international mobile equipment identification number (International Mobile Equipment Identification Number, IMEI) of the UE, and so on;

204: The HSS obtains subscription information of the UE according to the ID of the UE, and sends the subscription information of the UE to the mobility management network element through an update location acknowledgement message Update Location ACK.

Optionally, if the subscription information of the UE includes information for indicating that the UE is a UE of low data usage, the subscription information returned by the HSS to the mobility management network element includes the information for indicating that the UE is a UE of low data usage.

Optionally, after receiving the ID of the mobility management network element that serves the UE, the HSS stores the ID information of the mobility management network element that serves the UE into the subscription data of the UE.

205: The mobility management network element receives the Update Location ACK message, and obtains the subscription information of the UE.

If the subscription information of the UE includes information for indicating that the UE is a UE of low data usage, the mobility management network element may determine that the UE is a UE of low data usage according to the subscription information of the UE.

Optionally, in the process that the UE of low data usage gets attached to the network side, no bearer is activated, and the network side does not need to allocate any bearer resource to the UE, and does not need to allocate any IP address to the UE.

Optionally, when the UE requests activating the bearer in the attach procedure, the mobility management network element may reject the activation request from the UE if the mobility management network element determines that the UE is a UE of low data usage. This step comprises the following steps of: If the UE requests PDP activation and the SGSN determines that the UE is a UE of low data usage, the SGSN may reject the request; or, if the UE requests PDN connection setup and the MME determines that the UE is a UE of low data usage, the MME may reject the request.

206: The mobility management network element determines that the UE is a UE of low data usage, and therefore sends a update location request message to the MTC server. The update location request message carries the ID of the UE, and may further include the ID of the mobility management network element.

Optionally, before the mobility management network element sends the update location request message to the MTC server, the mobility management network element may obtain address information of the MTC server. The obtaining the address information of the MTC server comprises the following steps of:

The mobility management network element may obtain the address of the MTC server from the received subscription data of the UE. The address information of the MTC server may be IP address information of the MTC server, or a fully qualified domain name/full domain name (Fully Qualified Domain Name FQDN). The mobility management network element obtains the address of the MTC server by parsing the FQDN through a DNS.

207: The MTC server returns an acknowledgement message to the mobility management network element, and an association is set up between the MTC server and the mobility management network element.

Step 206 and step 207 are a process of setting up an association between the MTC server and the mobility management network element that serves the UE, that is, a process for the mobility management network element that serves the UE to register with the MTC server. After the association is set up, the MTC server may notify the UE of reporting data through the mobility management network element. Step 206 and step 207 are optional. The mobility management network element may send the data information received from the UE of low data usage to the MTC server directly without setting up the association with the MTC server.

208: The mobility management network element sends a registration acceptance message to the UE. The registration acceptance message may be an attach accept message Attach Accept, or a router area update accept message RAU Accept, or a tracking area update accept message TAU Accept, and so on.

Optionally, the registration acceptance message may include indication information for indicating that the UE is a UE of low data usage.

209: After receiving the registration acceptance message, the UE sends an NAS message to the mobility management network element. The NAS message includes data transmitted to the MTC server.

When the UE of low data usage transmits data information, no bearer is activated. The data to be sent to the mobility management network element is transmitted to the mobility management network element through a control plane. For example, the data information to be sent to the mobility management network element is encapsulated into an NAS message, and sent to the mobility management network element.

210: After receiving the NAS message, the mobility management network element sends the data, which is included in the NAS message and needs to be sent to the MTC server, to the MTC server.

Optionally, when the mobility management network element determines that the UE is a UE of low data usage, the mobility management network element parses the NAS message to obtain the data which needs to be sent from the UE to the MTC server, and sends the data to the MTC server; or, the mobility management network element sends the data, which needs to be sent from the UE to the MTC server, to the MTC server directly.

Optionally, the mobility management network element may send data to the MTC server through an IP data packet.

Optionally, in this process, the mobility management network element does not need to allocate any bearer resource or IP address information to the UE.

211: The MTC server returns an acknowledgement message to the mobility management network element.

212: The mobility management network element returns an acknowledgement message to the UE.

It should be noted that in this embodiment, the UE sends an NAS message to the mobility management network element, where the NAS message includes the data that needs to be sent to the MTC server. The NAS message may be a registration request message, and therefore, the acknowledgement message in step 212 may be a registration acceptance message.

It should be noted that in this embodiment and subsequent embodiments, the foregoing optimization solution may be subscribed for in the HSS as a specific optimization policy of the UE of low data usage, and may be sent to the mobility management network element subsequently as subscription data of the UE. When receiving a registration request from the UE, the mobility management network element determines that the UE is a UE of low data usage, and therefore, sends the data information of the UE to the MTC server directly.

In this embodiment, if the mobility management network element determines that the UE is a UE of low data usage, the mobility management network element sends data information of the UE to the MTC server directly for processing, thereby ensuring successful implementation of the service of the UE of low data usage. Further, when the UE of low data usage sends data information, no bearer is activated. The data information is sent to the mobility management network element through a control plane directly, and the network side does not need to allocate bearer resources to the UE. Therefore, the network load is reduced, and services of other types of terminals are not affected.

Figure 3:
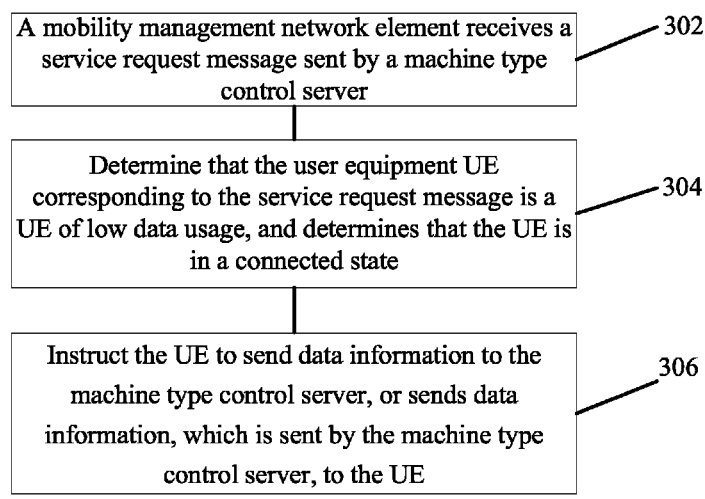
FIG. 3 is a third schematic diagram of an information processing method according to an embodiment of the present invention.

Referring to FIG. 3, an embodiment of the present invention provides another information processing method, including the following steps:

302: A mobility management network element receives a service request message sent by a machine type control server.

Herein, the service request message may request the UE to report data, or request sending data to the UE.

When the machine type control server needs to perform a service, the machine type control server sends a corresponding service request message to the mobility management network element. The service request message may include indication information for instructing the UE to report data or indicating that the data is to be sent to the UE.

Optionally, before the MTC server sends a service request to the mobility management network element that serves the UE, the MTC server needs to obtain address information of the mobility management network element that serves the UE. The obtaining comprises the steps of:

if the mobility management network element registers with the machine type control server, the machine type control server obtains the address information of the mobility management network element according to registration information; or if the mobility management network element does not register with the machine type control server, the machine type control server searches the home subscriber server for the address information of the mobility management network element.

304: The mobility management network element determines that the user equipment corresponding to the service request message is a user equipment of low data usage, and determines that the user equipment is in a connected state.

After determining that the user equipment corresponding to the service request message is a user equipment of low data usage, the mobility management network element determines whether the user equipment is in a connected state; if the user equipment is in a connected state, the mobility management network element performs step 306; if the user equipment is not in the connected state, the mobility management network element pages the user equipment. The paging may include: sending a paging message to the user equipment, and receiving a paging response message from the UE. After the paging succeeds, the mobility management network element changes the state of the user equipment to the connected state, and performs step 306.

306: The mobility management network element instructs the user equipment to send data information to the machine type control server, or sends data information sent by the machine type control server to the user equipment.

After the mobility management network element determines that the UE is in a connected state, if the service request sent by the machine type control server includes indication information for notifying the user equipment of reporting data, the mobility management network element instructs the user equipment to send data information to the machine type control server, and the sending the data information comprises the following steps of: The mobility management network element receives the data information sent by the user equipment, and sends the data information to the machine type control server. If the service request includes indication information for indicating sending data information to the user equipment, the mobility management network element forwards the data information sent by the machine type control server to the user equipment, and the forwarding the data information comprises the following steps of: The mobility management network element receives the data information sent by the machine type control server, and sends the data information to the user equipment.

In this embodiment of the present invention, the machine type control server may actively trigger the user equipment to report data information, or actively send data information to the user equipment, thereby implementing data exchange between the machine type control server and the user equipment. In the process of exchanging data between the user equipment and the machine type control server, the mobility management network element does not allocate bearer resources to the user equipment. Therefore, the network load is reduced, and the normal implementation of the services of other types of terminals is ensured.

Figure 4:
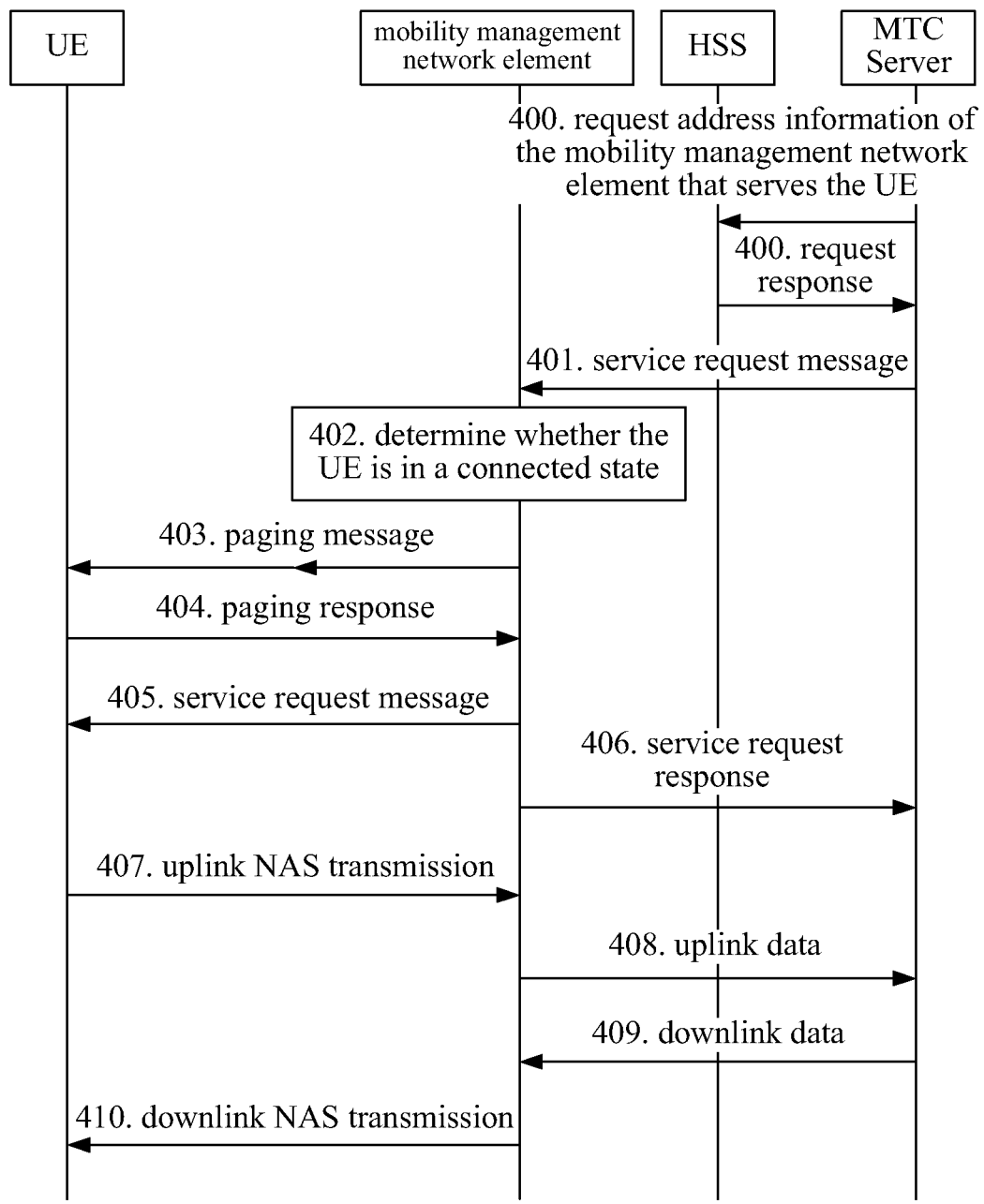
FIG. 4 is a fourth schematic diagram of an information processing method according to an embodiment of the present invention.

Referring to FIG. 4, an embodiment of the present invention provides an information processing method. For example, in a scenario where an MTC server notifies a UE of reporting data through a mobility management network element, the method comprises the following steps of:

Step 400: Before sending a service request message to the mobility management network element, the MTC server needs to obtain information about the mobility management network element that serves a UE corresponding to the service request. The obtaining includes the following scenarios:

(1) If the mobility management network element does not register with the MTC server, the MTC server requests the information about the serving mobility management network element from the HSS. Specifically, the MTC server may send an ID of the UE corresponding to the service request to the HSS, and according to the ID of the UE, the HSS searches for the information about the mobility management network element serving the UE, and sends the information to the MTC server. The mobility management network element information may be ID information of the mobility management network element, for example, an SGSN number or an MME ID; the MTC server may find the address of the mobility management network element according to the mobility management network element information, for example, perform DNS parsing according to the mobility management network element ID to obtain IP address information of the mobility management network element.

(2) If the mobility management network element has already registered with the MTC server, the MTC server obtains the address information of the mobility management network element according to registration information of the mobility management network element.

401: When intending to perform a service, the MTC server sends a service request message to the mobility management network element.

Herein, "intending to perform a service" means that the MTC server requests the UE to upload data, or sends data to the UE. In this embodiment, "intending to perform a service" means that the MTC server requests the UE to upload data.

The service request message may be a paging Paging message, and the service request message includes the ID of the UE. Further, the service request message may include an MTC server ID and service indication information which instructs the UE to report data. For example, the service request message includes a service indicator information element which notifies the UE of uploading data.

402: After receiving the service request message, the mobility management network element determines that the user equipment UE corresponding to the service request message is a UE of low data usage, and determines the state of the UE. If the UE is in an idle state, the mobility management network element performs step 403; if the UE is in a connected state, the mobility management network element performs step 405 directly.

The determining that the UE corresponding to the service request is a UE of low data usage comprises the following step of:

the service request sent by the MTC Server includes indication information for indicating that the UE is a UE of low data usage, and the mobility management network element determines that the UE is a UE of low data usage according to the indication information; or the mobility management network element obtains subscription data of the UE, and determines that the UE is a UE of low data usage according to the subscription data of the UE.

403: The mobility management network element determines that the UE is in an idle state, and sends a paging message to the UE. The message carries the ID of the UE.

The ID of the UE may include an IMSI of the UE, and may further include a globally unique temporary identity (GUTI) or a Packet Temporary Mobile Subscriber Identity (P-TMSI) of the UE.

The idle state of the UE means that no NAS signaling connection exists between the mobility management network element and the UE, and that the mobility management network element is unable to transmit an NAS message to the UE directly.

404: The UE receives the paging message. When determining that the network side is paging the UE, the UE sends a paging response to the mobility management network element. The paging response may be a service request message Serving Request;

The determining whether the network side is paging the UE may include the following step:

The UE determines whether ID information included in the paging message matches the ID of the UE, and, if the ID information included in the paging message matches the ID of the UE, the UE determines that the network side is paging the UE, and sends a paging response to the mobility management network element; if the ID information included in the paging message does not match the ID of the UE, the UE determines that the network side is not paging this UE, and makes no response to the paging message.

405: The mobility management network element sends a service request message to the UE;

After receiving the paging response from the UE, the mobility management network element determines that the state of the UE changes from the idle state to the connected state. Because the UE is a UE of low data usage, the mobility management network element recovers only the NAS signaling connection to the UE, without activating the bearer. Therefore, the mobility management network element does not need to allocate any bearer resource to the UE.

The connected state of the UE means that NAS messages may be transmitted between the UE and the mobility management network element directly.

The service request message may be a message for requesting the UE to upload data to the MTC server, and the mobility management network element encapsulates the service request message received from the MTC Server into an NAS message and then sends the NAS message to the UE.

406: The mobility management network element returns a service response message to the MTC Server.

407: The UE obtains the service request message according to the received NAS message, and knows the need of transmitting data according to the service request message. Therefore, the UE sends an uplink NAS transfer message to the mobility management network element. The message includes data that needs to be sent to the MTC Server.

Optionally, when the UE transmits data to the mobility management network element, no bearer is activated, and the data is sent to the mobility management network element through a control plane directly. For example, the data information is encapsulated into an NAS message, and then sent to the mobility management network element.

408: The mobility management network element receives the NAS message, and sends the data, which is included in the NAS message and needs to be sent to the MTC Server, to the MTC Server.

409: The MTC Server returns an acknowledgement message to the mobility management network element.

410: The mobility management network element returns an acknowledgement message to the UE.

In this embodiment, when the MTC Server intends to perform a service, the mobility management network element may notify the UE of uploading data, thereby ensuring successful implementation of the service of the UE of low data usage. Further, when the UE of low data usage transmits data, no bearer is activated. The data is transmitted through a control plane directly, and the network side does not need to allocate bearer resources to the UE. Therefore, the network load is reduced, and normal operation of other types of terminals can be ensured.

This embodiment deals with an exemplary scenario where the MTC server requests the UE to upload data. In a scenario where the MTC server needs to send data to the UE, the implementation process is similar to that in this embodiment, and is not detailed here.

Figure 5:
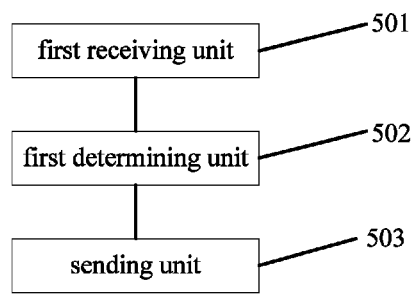
FIG. 5 is a first schematic diagram of a mobility management network element according to an embodiment of the present invention.

Referring to FIG. 5, an embodiment of the present invention provides a mobility management network element, including:

a first receiving unit 501, configured to receive a message that includes data information of a user equipment UE;

a first determining unit 502, configured to determine that the UE is a UE of low data usage; and a sending unit 503, configured to send the received data information of the UE to an machine type control server.

In another embodiment of the present invention, the first receiving unit 501 in the mobility management network element is further configured to receive subscription information of the UE sent by the home subscriber server.

Therefore, the first determining unit 502 of the mobility management network element determines that the UE is a UE of low data usage according to the subscription information of the UE received by the first receiving unit 501; or the first receiving unit is further configured to receive a registration request message from the UE, where the registration request message includes indication information for indicating that the UE is a UE of low data usage; and the first determining unit 502 determines that the UE is a UE of low data usage according to the registration request message of the UE received by the first receiving unit 501.

In another embodiment of the present invention, the mobility management network element may further include:

a registration request unit, configured to send a registration request message to the machine type control server so that the machine type control server obtains address information of the mobility management network element. The address information of the mobility management network element may be obtained as follows.

The registration request unit sends a registration request (such as a location update request) message to the machine type control server. The machine type control server returns a registration acceptance (such as an location update acknowledgement) message. In this way, the mobility management network element registers with the machine type control server, and the mobility management network element and the MTC server can obtain each other's address information.

In all embodiments of the present invention, the registration request message may be an attach request message Attach Request, or a router area update request message RAU Request, or a tracking area update request message TAU Request; and the mobility management network element may be a serving GPRS support node (Serving GPRS Support Node, SGSN) or a mobile management entity (Mobile Management Entity, MME), and so on.

In this embodiment, after determining that the UE is a UE of low data usage, the mobility management network element sends the data information of the UE received subsequently to the machine type control server, thereby ensuring successful implementation of normal services of the UE of low data usage. Further, when the UE sends data information to the mobility management network element, no bearer is activated, and the network side does not need to allocate bearer resources to the UE of low data usage. Therefore, the network load is reduced, and the communication of other types of terminals is not affected.

Figure 6A:
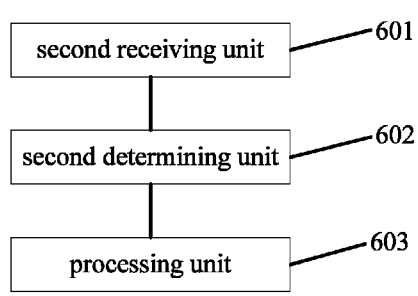
FIG. 6a is a second schematic diagram of a mobility management network element according to an embodiment of the present invention.

Referring to FIG. 6*a*, an embodiment of the present invention provides a mobility management network element, including:

a second receiving unit 601, configured to receive a service request message sent by a machine type control server;

a second determining unit 602, configured to determine that a UE corresponding to the service request message received by the second receiving unit 601 is a UE of low data usage, and determine that the UE is in a connected state; and a processing unit 603, configured to instruct, according to the service request message, the UE to send data information to the machine type control server, or send data information sent by the machine type control server to the UE.

Figure 6B:
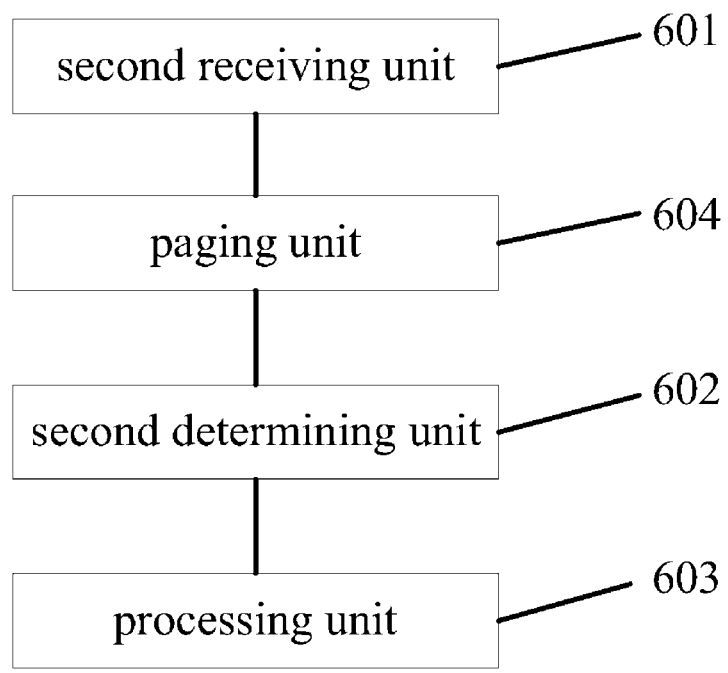
FIG. 6b is a third schematic diagram of a mobility management network element according to an embodiment of the present invention.

Referring to FIG. 6*b*, in another embodiment of the present invention, the mobility management network element may further include:

a paging unit 604, configured to send a paging message to the UE when the UE is in an idle state, and receive a paging response from the UE.

The second determining unit 602 determines that the UE is in a connected state according to the paging response received by the paging unit 604.

In another embodiment of the present invention, the processing unit receives a service request message sent by the machine type control server, and sends the service request message to the UE. The service request message includes indication information for instructing the UE to report data information; or the processing unit receives the data information and the service request message sent by the machine type control server, and sends the data to the UE according to indication information included in the service request, where the indication information is used for indicating sending data information to the UE.

In this embodiment, the mobility management network element may be a serving GPRS support node (Serving GPRS Support Node, SGSN) or a mobile management entity (Mobile Management Entity, MME), and so on.

The mobility management network element provided in this embodiment can notify the UE of reporting data; or forward the data, which is sent by the machine type control server to the UE, to the UE, according to the indication of the machine type control server, thereby ensuring successful implementation of services of the UE of low data usage. Further, when the UE sends data information to the mobility management network element, no bearer is activated, and the network side does not allocate bearer resources to the UE of low data usage. Therefore, the network load is reduced, and the communication of other types of terminals is not affected.

Figure 7:
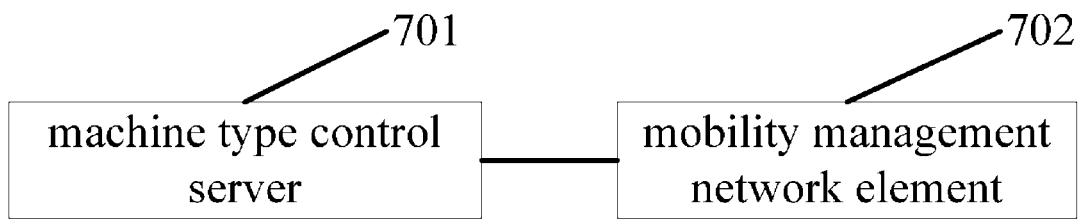
FIG. 7 is a schematic diagram of an information processing system according to an embodiment of the present invention.

Referring to FIG. 7, an embodiment of the present invention provides an information processing system, including a mobility management network element 702 and machine type control server 701, where:

the machine type control server 701 is configured to send a service request message to the mobility management network element 702; and the mobility management network element 702 is configured to: receive the service request message sent by the machine type control server 701, determine that a user equipment UE corresponding to the service request message is a UE of low data usage, determine that the UE is in a connected state, and instruct, according to the service request message, the UE to send data information to the machine type control server 701, or send data information sent by the machine type control server 701 to the UE.

In another embodiment of the present invention, the machine type control server 701 is further configured to determine address information of the mobility management network element 702 that serves the UE.

In another embodiment of the present invention, the machine type control server 701 may determine address information of the mobility management network element 702 according to registration information.

In another embodiment of the present invention, the machine type control server 701 may search a home subscriber server for address information of the mobility management network element 702.

In the information processing system provided in this embodiment, the mobility management network element can forward data between the UE of low data usage and the machine type control server, and ensure successful implementation of services of the UE of low data usage. Further, when the UE sends data information to the mobility management network element, no bearer is activated, and the network side does not allocate bearer resources to the UE of low data usage. Therefore, the network load is reduced, and the communication of other types of terminals is not affected.

Persons of ordinary skill in the art should understand that all or part of the steps of the method according to the embodiments of the present invention may be implemented by a program instructing relevant hardware. The program may be stored in a computer readable storage medium. When the program runs, the program executes the steps of the method specified in any embodiment of the present invention. The storage medium may be any medium capable of storing program codes, such as a ROM, a RAM, a magnetic disk, or a Compact Disk-Read Only Memory.

It is apparent to persons skilled in the art that various modifications and variations can be made to the present invention without departing from the scope or spirit of the present invention. The present invention shall cover the modifications and variations provided that they fall within the protection scope defined by the appended claims or equivalents thereof.

What is claimed is:

1. An information processing method, comprising:
   receiving, by a mobility management network element, a message that comprises data information of a user equipment (UE) through a control plane;
   determining, by the mobility management network element, that the UE is a UE of low data usage; and
   sending, by the mobility management network element, the received data information of the UE to a machine type control server without allocating bearer resource to the UE.

2. The information processing method according to claim 1, wherein the determining that the UE is a UE of low data usage comprises:
   receiving, by the mobility management network element, subscription information of the UE sent by a home subscriber server, and determining that the UE is a UE of low data usage according to the subscription information of the UE; or
   determining, by the mobility management network element, that the UE is a UE of low data usage according to a registration request message received from the UE, wherein the registration request message comprises indication information for indicating that the UE is a UE of low data usage.

3. The information processing method according to claim 1, wherein before sending the received data information of the UE to the machine type control server, the method further comprises:
   receiving, by the mobility management network element, subscription information of the UE sent by a home subscriber server; and
   obtaining, by the mobility management network element, address information of the machine type control server according to the subscription information of the UE.

4. The information processing method according to claim 1, further comprising:
   sending, by the mobility management network element, a registration request message to the machine type control server so that the machine type control server obtains address information of the mobility management network element.

5. A mobility management network element, comprising:
   a first receiving unit, configured to receive a message that comprises data information of a user equipment through a control plane;
   a first determining unit, configured to determine that the UE is a UE of low data usage; and
   a sending unit, configured to send the received data information of the UE to a machine type control server without allocating bearer resource to the UE.

6. The mobility management network element according to claim 5, wherein:
   the first receiving unit is further configured to receive subscription information of the UE sent by a home subscriber server;
   the first determining unit is configured to determine that the UE is a UE of low data usage according to the subscription information of the UE received by the first receiving unit; or
   the first receiving unit is further configured to receive a registration request message from the user equipment, wherein the registration request message comprises indication information for indicating that the UE is a UE of low data usage; and
   the first determining unit is configured to determine that the UE is a UE of low data usage according to the registration request message of the UE received by the first receiving unit.

7. The mobility management network element according to claim 5, further comprising:
   a registration request unit, configured to send a registration request message to the machine type control server so that the machine type control server obtains address information of the mobility management network element.

8. An information processing system, comprising a mobility management network element and a machine type control server, wherein:
  the machine type control server is configured to send a service request message to the mobility management network element; and
  the mobility management network element is configured to: receive the service request message sent by the machine type control server, determine that a user equipment corresponding to the service request message is a UE of low data usage, determine that the UE is in a connected state, and instruct the UE to send data information to the machine type control server according to the service request message, or, send data information, which is sent by the machine type control server, to the UE, according to the service request message, wherein the UE is not allocated with bearer resource by the mobility management network element.

9. The information processing system according to claim 8, wherein:
  the machine type control server is further configured to determine address information of the mobility management network element that serves the UE.

10. The information processing system according to claim 9, wherein:
  the machine type control server obtains the address information of the mobility management network element according to registration information; or
  the machine type control server searches a home subscriber server for the address information of the mobility management network element.

\* \* \* \* \*